(12) United States Patent
Araujo

(10) Patent No.: US 8,776,723 B2
(45) Date of Patent: Jul. 15, 2014

(54) SYSTEM AND METHOD FOR COGNITIVE ENRICHMENT OF AN ANIMAL

(71) Applicant: CanCog Technologies, Inc., Toronto (CA)

(72) Inventor: Joseph A Araujo, Toronto (CA)

(73) Assignee: CanCog Technologies, Inc., Toronto (CA)

( * ) Notice: Subject to any disclaimer, the term of this patent is extended or adjusted under 35 U.S.C. 154(b) by 0 days.

(21) Appl. No.: 14/036,998

(22) Filed: Sep. 25, 2013

(65) Prior Publication Data
US 2014/0020631 A1 Jan. 23, 2014

Related U.S. Application Data

(63) Continuation of application No. 13/070,420, filed on Mar. 23, 2011, now Pat. No. 8,578,882.

(51) Int. Cl.
*A01K 29/00* (2006.01)
*A01K 15/02* (2006.01)

(52) U.S. Cl.
USPC ............ 119/51.01; 119/905; 340/573.3

(58) Field of Classification Search
USPC ............ 119/51.01, 712, 718, 719, 720, 905, 119/908; 340/573.3
See application file for complete search history.

(56) References Cited

U.S. PATENT DOCUMENTS

| | | | |
|---|---|---|---|
| 3,727,740 A * | 4/1973 | Evans et al. | 194/239 |
| 6,273,027 B1 * | 8/2001 | Watson et al. | 119/712 |
| 6,837,184 B2 * | 1/2005 | Gondhalekar et al. | 119/421 |
| 6,904,868 B2 * | 6/2005 | Block et al. | 119/51.12 |
| 7,146,934 B1 * | 12/2006 | Staley | 119/709 |
| 7,269,516 B2 * | 9/2007 | Brunner et al. | 702/19 |
| 7,328,671 B2 * | 2/2008 | Kates | 119/720 |
| 7,380,518 B2 * | 6/2008 | Kates | 119/72 |
| 7,409,924 B2 * | 8/2008 | Kates | 119/720 |
| 7,424,867 B2 * | 9/2008 | Kates | 119/720 |
| 7,434,541 B2 * | 10/2008 | Kates | 119/720 |
| 7,634,975 B2 * | 12/2009 | Kates | 119/712 |
| 7,770,541 B2 * | 8/2010 | Boyd | 119/719 |
| 7,861,676 B2 * | 1/2011 | Kates | 119/720 |
| 7,930,993 B2 * | 4/2011 | Gross | 119/51.02 |
| 8,248,248 B1 * | 8/2012 | Hill | 340/573.3 |
| 8,307,785 B2 * | 11/2012 | Zimmerman et al. | 119/51.02 |
| 8,312,845 B2 * | 11/2012 | Giunta | 119/721 |

* cited by examiner

*Primary Examiner* — Yvonne Abbott
(74) *Attorney, Agent, or Firm* — Cotman IP Law Group, PLC

(57) ABSTRACT

A system and method for cognitive enrichment of an animal. At least one display device is configured to display stimuli to an animal. At least one input device is configured to accept input from the animal. At least one reward dispenser is configured to dispense a reward to the animal. At least one processor is communicatively coupled with the at least one display device, the at least one input device, and the at least one reward dispenser. Execution of computer-readable instructions causes the at least one processor to carry out steps including displaying one or more stimuli to the animal using the at least one display device, accepting an input from the animal corresponding to at least one of the one or more stimuli, making a dispensing decision based on the input, and dispensing a reward using the at least one reward dispenser based on the dispensing decision.

20 Claims, 11 Drawing Sheets

SYSTEM AND METHOD FOR COGNITIVE ENRICHMENT OF AN ANIMAL

CROSS-REFERENCE TO RELATED APPLICATIONS

The present application is a continuation of U.S. patent application Ser. No. 13/070,420, filed on Mar. 23, 2011, specification of which is herein incorporated by reference for completeness of disclosure.

BACKGROUND OF THE INVENTION

1. Field of the Invention

Embodiments of the invention described herein pertain to the field of animal care. More particularly, but not by way of limitation, one or more embodiments of the invention enable a system and method for cognitive enrichment of an animal.

2. Description of the Related Art

In countries all over the world, animals are domesticated. Domesticated animals, including canines, felines, and other animals require care. For example, domesticated animals must be fed a diet on a regular schedule. The diet must satisfy the nutritional requirements and needs of the animal. Often, specialized food products for the target animal are available along with recommended feeding instructions in order to provide the animal a complete and balanced diet. It is up to the animal's caretaker to ensure that the feeding instructions are followed.

Specialized pet treats are also available. These treats also come with recommended feeding instructions. Often, the nutritional content of these treats do not provide a complete and balanced diet for the animal. It is often recommended that such treats are offered in a limited fashion.

It is difficult to allow an animal to choose a specific type of food or a combination of foods and/or treats. Feeding instructions for specialized food products often do not take into account that more than one food product will be offered to the animal. Feeding of a predetermined food often occurs based on a predetermined schedule. The timing or other preferences of the domesticated animal are typically not taken into consideration.

Food products, including treats, are often used in the training of domesticated animals. Such rewards help the animal associate a correct response with the reward. Non-food rewards, such as toys, praise, and other rewards, are also used to help the animal learn. Negative reinforcement, such as electric fences and collars with unpleasant stimuli are often used to help train animals to avoid unwanted responses. The use of negative reinforcement may be problematic; it is viewed by some as inhumane, and may exacerbate aggressive, anxious or other undesirable behaviors.

It is also widely accepted that mental stimulation and exercise are highly beneficial to a domesticated animal. Training is a form of mental stimulation. However, domesticated animals also benefit from mental stimulation outside of training. Mental stimulation and exercise often require a high level of interaction between the animal and a human, such as a caretaker, owner, or trainer. Pet owners are encouraged to regularly engage their pet in both physical and mental stimulation. Without regular human-driven interaction, domesticated animals may not receive adequate mental stimulation. Furthermore, even with regular human-driven interaction, it is typically impractical for a caretaker, owner, or trainer to provide mental stimulation around the clock. In extreme cases, the absence of owner presence may also be associated with anxiety, i.e. separation anxiety, or other undesirable behaviors.

Interaction with other animals may also provide mental stimulation. It is common for a household to have more than one pet. However, it is not always feasible to provide a domestic animal with this form of stimulation.

To overcome the problems and limitations described above there is a need for a system and method for cognitive enrichment of an animal.

BRIEF SUMMARY OF THE INVENTION

Embodiments of the system and method for cognitive enrichment of an animal described herein provide cognitive enrichment and stimulation, enable cognitive assessment outside of a clinical setting, permit collection of cognitive data, and enable applications for establishing food preferences. Furthermore, the systems and methods described herein provide a tool to address separation anxiety, such as by distracting pet from owner absence and allowing owner to interact with pet over a network throughout the day.

One or more embodiments of the system and method for cognitive enrichment of an animal described herein are directed to a system for cognitive enrichment of a domesticated animal. In one or more embodiments, the system for cognitive enrichment of a domesticated animal includes at least one display device configured to display stimuli to an animal.

In one or more embodiments, the system for cognitive enrichment of a domesticated animal further includes at least one input device configured to accept input from the animal.

In one or more embodiments, the animal is a canine.

In one or more embodiments, the at least one display device and the at least one input device include a touch-screen display capable of displaying images on a screen and accepting touch input on the screen.

In one or more embodiments, the system for cognitive enrichment of a domesticated animal further includes at least one reward dispenser configured to dispense at least one reward to the animal. In one or more embodiments, the at least one reward dispenser includes a plurality of food chambers configured to store a plurality of food types. The at least one reward dispenser is configured to dispense at least one selected food from at least one of the plurality of food chambers.

In one or more embodiments, the system for cognitive enrichment of a domesticated animal further includes at least one processor communicatively coupled with the at least one display device, the at least one input device, and the at least one reward dispenser. In one or more embodiments, at least one of the at least one display device, the at least one input device, and the at least one reward dispenser is communicatively coupled with the at least one processor wirelessly.

In one or more embodiments, the system for cognitive enrichment of a domesticated animal further includes a computer-readable medium including computer-readable instructions. Execution of the computer-readable instructions by the at least one processor causes the at least one processor to carry out steps.

In one or more embodiments, the steps carried out by the processor include displaying one or more stimuli to the animal using the at least one display device.

In one or more embodiments, the steps carried out by the processor further include accepting an input from the animal corresponding to at least one of the one or more stimuli.

In one or more embodiments, the steps carried out by the processor further include making a dispensing decision based on the input.

In one or more embodiments, the steps carried out by the processor further include dispensing a reward using the at least one reward dispenser based on the dispensing decision.

In one or more embodiments, the one or more stimuli includes images corresponding to the plurality of food types. The input may include a food selection corresponding to a selected food type. The dispensing decision may be further based on at least one nutritional calculation. The reward may include the selected food type.

In one or more embodiments, execution of the computer-readable instructions further causes the at least one processor to carry out steps including accepting from a user at least one animal diet parameter corresponding to the animal, determining at least one nutritional limitation for a time period based on the at least one animal diet parameter, tracking periodic nutritional intake information corresponding to food dispensed during a current time period, and periodically resetting the periodic nutritional intake information. In one or more embodiments, the nutritional calculation includes determining if dispensing the reward would exceed any of the at least one nutritional limitation during the current time period.

In one or more embodiments, execution of the computer-readable instructions further causes the at least one processor to carry out steps including accepting from a user at least one animal diet parameter corresponding to the animal, determining at least one nutritional requirement for a time period based on the at least one animal diet parameter, tracking periodic nutritional intake information corresponding to food dispensed during a current time period, selecting the stimuli for display based on the periodic nutritional intake information and the at least one nutritional requirement, and periodically resetting the periodic nutritional intake information.

In one or more embodiments, the system for cognitive enrichment of a domesticated animal further includes at least one image capture device configured to capture a video feed, where execution of the computer-readable instructions further causes the at least one processor to carry out steps including establishing a connection to a remote computing device, and transmitting the video feed to the remote computing device in response to a triggering event. In one or more embodiments, the triggering event includes at least one of an action of the animal, a threshold environmental reading, and a connection request from the remote computing device. In one or more embodiments, execution of the computer-readable instructions further causes the at least one processor to carry out steps including receiving a remote video feed from the remote computing device, and displaying the remote video feed on at least one of the at least one display device.

In one or more embodiments, execution of the computer-readable instructions further causes the at least one processor to carry out steps including determining an identity of the animal interacting with the at least one display device and the at least one input device.

In one or more embodiments of the system for cognitive enrichment, the one or more stimuli displayed to the animal includes a game. The dispensing decision may be based on a comparison of the input to a correct response. In one or more embodiments, at least one of the one or more stimuli are displayed with animation. The game may be configured to improve a skill of the animal. In one or more embodiments, the game includes a level selected from a multi-level battery of cognitive training exercises.

In one or more embodiments, execution of the computer-readable instructions further causes the at least one processor to carry out steps including downloading at least one add-on module over a network. The at least one add-on module may include computer-readable add-on instructions configured to modify at least one of the stimuli, the input and the dispensing decision.

In one or more embodiments of the system for cognitive enrichment, execution of the computer-readable instructions further causes the at least one processor to carry out steps including uploading local data corresponding to the animal over a network, downloading cloud data corresponding to other animals over the network, and displaying a comparison of the local data and the cloud data. Execution of the computer-readable instructions may further cause the at least one processor to upload parameter data corresponding to the animal over the network, where the parameter data includes at least one parameter selected from animal breed, age and sex. In one or more embodiments, the parameter data includes at least one parameter reflecting an animal's household. The comparison may be based on one or more of the at least one parameter.

One or more embodiments of the system and method for cognitive enrichment of an animal described herein are directed to a computer-readable medium including computer-readable instructions for collecting domesticated animal data.

Execution of the computer-readable instructions by one or more processors causes the one or more processors to carry out steps.

In one or more embodiments, the steps carried out by the processor include registering a plurality of domesticated animals associated with at least one device configured to interact with at least one of the plurality of domesticated animals.

In one or more embodiments, the steps carried out by the processor further include receiving parameter data corresponding to the plurality of domesticated animals. The parameter data may include at least one parameter selected from animal breed, age and sex. In one or more embodiments, the parameter data includes at least one parameter reflecting an animal's household.

In one or more embodiments, the steps carried out by the processor further include receiving recorded data corresponding to the plurality of domesticated animals from the at least one device. The recorded data may include at least one of menu choice data, nutritional intake data, cognitive performance data, activity data, behavioral data and physiological data.

In one or more embodiments, the steps carried out by the processor further include processing the recorded data based on the at least one parameter to generate trend data for at least one of the at least one parameter.

In one or more embodiments, the steps carried out by the processor further include providing the trend data to at least one of the at least one device associated with at least one of the plurality of domesticated animals.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for cognitive enrichment of an animal will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
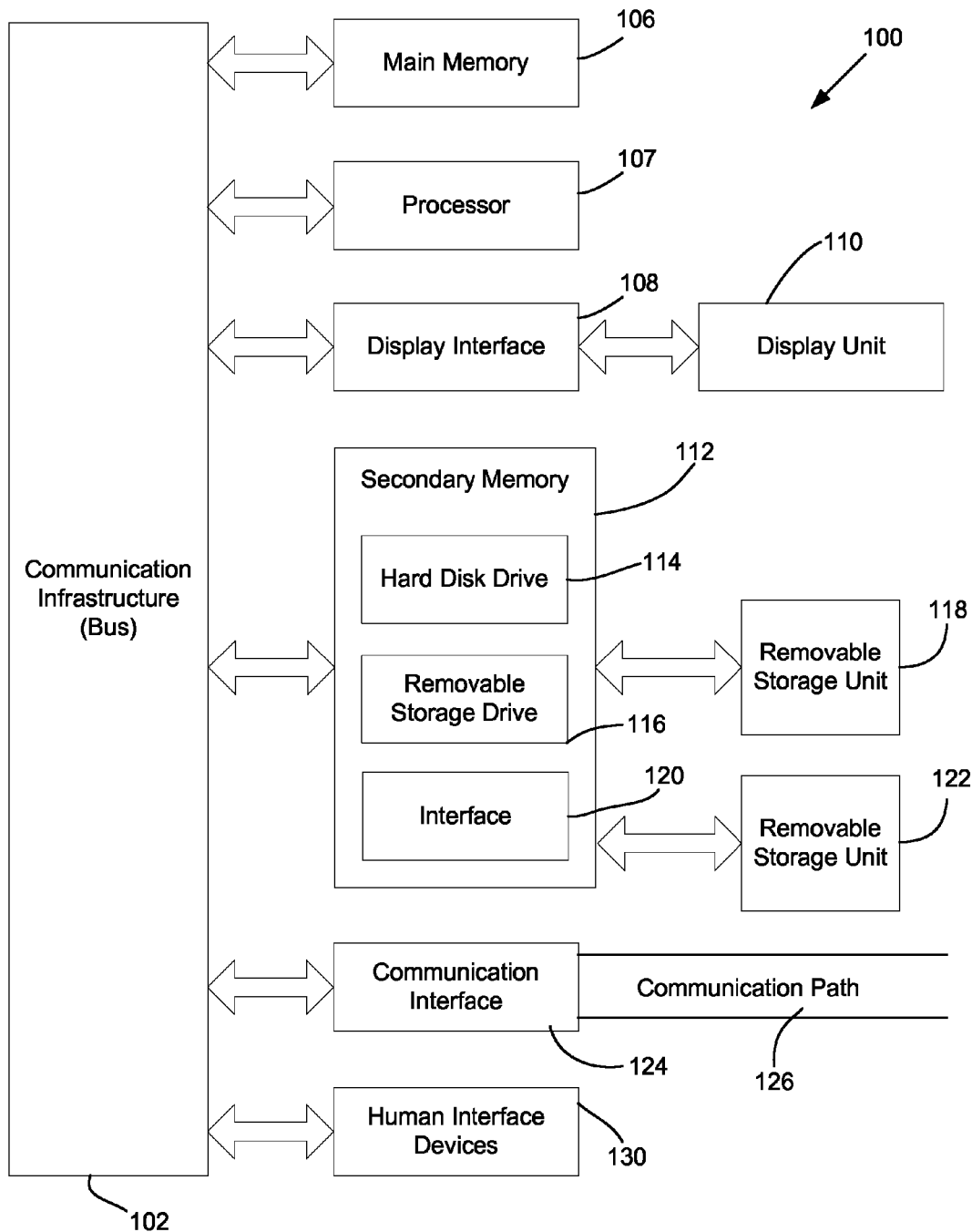
FIG. 1 illustrates a general-purpose computer and peripherals that, when programmed as described herein, may operate as a specially programmed computer capable of implementing one or more embodiments of systems and methods for cognitive enrichment of an animal.

FIG. 1 illustrates a general-purpose computer and peripherals that, when programmed as described herein, may operate as a specially programmed computer capable of implementing one or more embodiments of systems and methods for cognitive enrichment of an animal. The components of system 100 are described herein.

Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Figure 2:
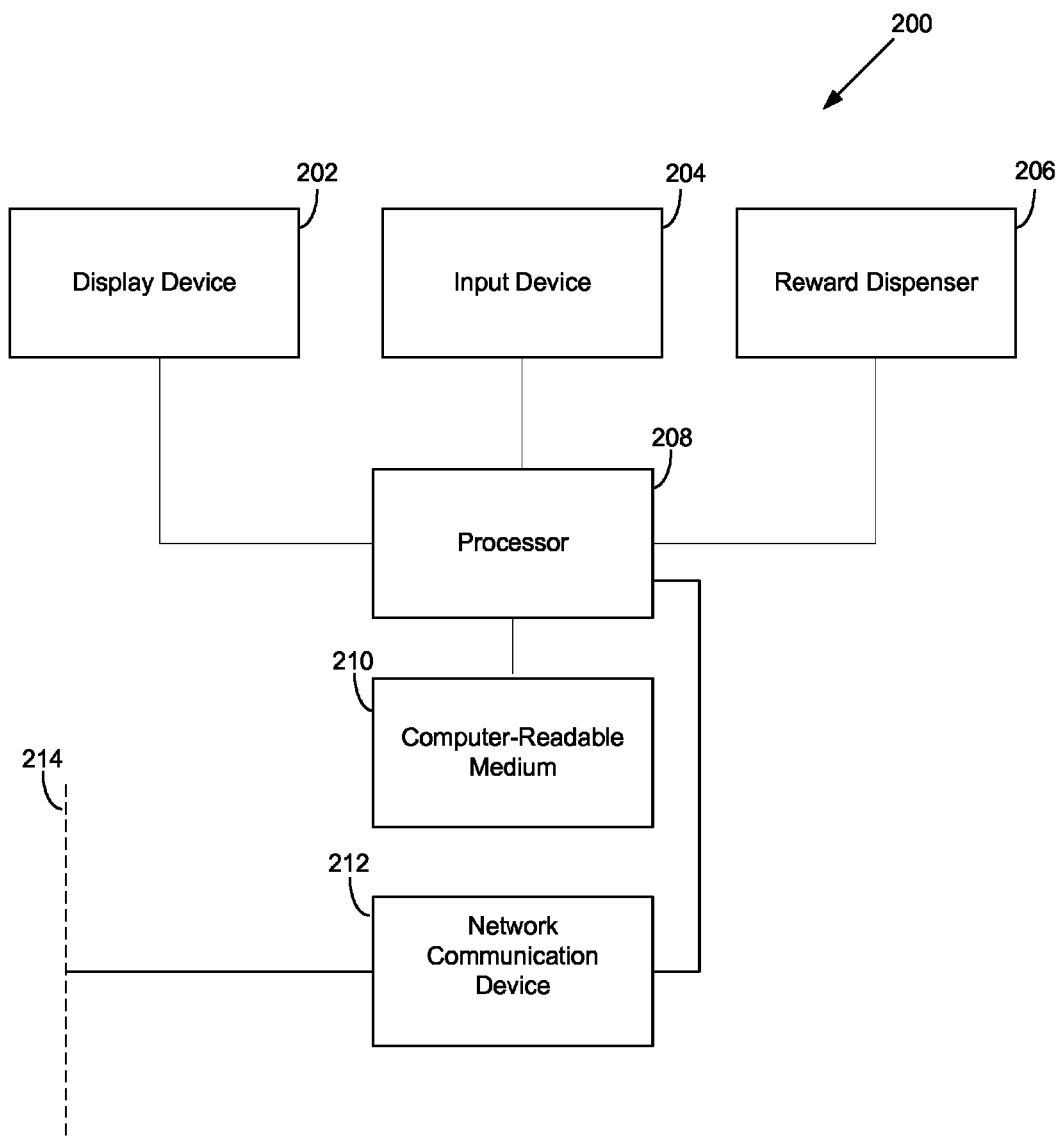
FIG. 2 illustrates a system diagram in accordance with one or more embodiments of systems and methods for cognitive enrichment of an animal.

FIG. 2 illustrates a system diagram in accordance with one or more embodiments of systems and methods for cognitive enrichment of an animal. Cognitive enrichment system 200 includes at least one display device 202. Display device 202 is configured to display stimuli to an animal. The animal may include any domesticated animal, including any pet, such as canines, felines and any other domesticated animal. The stimuli may include visual, auditory, or any other sensory stimuli. In one or more embodiments, visual stimuli are displayed on display device 202. Visual stimuli may include any displayable image. In one or more embodiments, visual stimuli differ from each other in color, shape, and size in a manner typically discernable by the type of animal.

Cognitive enrichment system 200 further includes at least one input device 204. Input device 204 is configured to accept input from the animal. In one or more embodiments, the input corresponds to a selection of a stimuli displayed by display device 202. Input device 204 may include an image capture device, a sound recording device, one or more sensors, or any other device capable of interpreting input from the animal.

In one or more embodiments, cognitive enrichment system 200 includes a touch-screen display capable of displaying images on a screen and accepting touch and put on the screen, where the touch-screen display functions as both display device 202 and input device 204.

Cognitive enrichment system 200 further includes at least one reward dispenser 206. Reward dispenser 206 is configured to dispense at least one reward to the animal. In one or more embodiments, the reward is a food reward. Reward dispenser 206 may be configured to dispense multiple types of rewards, including multiple types of food reward. Other suitable rewards include toys and any other object desirable to the animal. In one or more embodiments, cognitive enrichment system 200 is further configured to dispense other forms of positive reinforcement, such as sights, sounds and/or symbols associated with praise, auditory and/or visual entertainment, or any other positive reinforcement. Cognitive enrichment system 200 may be configured to dispense negative reinforcement, such as an unpleasant sound, image, video, or any other negative reinforcement that can be delivered autonomously. In one or more embodiments, only positive rewards are generated and/or dispensed by cognitive enrichment system 200.

Cognitive enrichment system 200 further includes at least one processor 208. Processor 208 is communicatively coupled with display device 202, input device 204 and reward dispenser 206. In one or more embodiments, at least one of display device 202, input device 204 and reward dispenser 206 is wirelessly coupled with processor 208. Processor 208 may be configured to control display device 202, input device 204 and reward dispenser 206.

Processor 208 is communicatively coupled with computer-readable medium 210. Computer-readable medium 210 includes computer-readable instructions. Execution of the computer-readable instructions by processor 208 causes processor 208 to display with one or more stimuli to the animal using display device 202, accept input from the animal using input device 204, make a dispensing decision based on the input, and dispense a reward using reward dispenser 206 based on the dispensing decision. A different reward or a different reward quantity may be dispensed using reward dispenser 206 for different stimuli selected by the animal. In one or more embodiments, processor 208 is further configured to track nutritional intake information based on a quantity of food reward dispensed by reward dispenser 206.

In one or more embodiments, the stimuli displayed on display device 202 are objects displayed in game. In the game, a correct input response may be determined. The dispensing decision is based on a comparison of the input from the animal to the correct response. In one or more embodiments, a correct response includes selection of at least one correct stimuli by the animal. The game may be configured to evaluate and/or improve one or more skills of the animal, such as a cognitive skill, a coordination skill, a memory skill, a speed skill, an accuracy skill, a behavioral skill, or any other skill.

In one or more embodiments, the game is a level selected from a multi-level battery of cognitive training exercises. One multi-level battery of cognitive training exercises is disclosed in U.S. patent application Ser. No. 12/889,725, entitled COGNITIVE ASSESSMENT AND TRAINING OF AN ANIMAL and filed on Sep. 24, 2010, which is hereby incorporated in its entirety for completeness of disclosure. In an exemplary multi-leveled battery of cognitive training exercises, a preliminary level may be used to acclimate the animal to the cognitive enrichment system. A reward level may be used to acclimate the animal to the presentation of the reward, including the method of delivery of the reward. An object level may be used for associating an object selection with a reward. During an object level trial, a stimulus is presented to the animal, and the animal earns the reward by selecting the stimulus. A discrimination level may be used for associating a specific object with a reward. During a discrimination level trial, two or more stimuli are presented to the animal, and the animal earns the reward by selecting the correct stimulus associated with the reward. A reversal level may be used to disassociate a previously learned association between a reward and a specific object. During a reversal level trial, two or more stimuli are presented to the animal, where selection of a first stimulus was previously rewarded. The animal earns the reward by selecting a second stimulus that was previously unrewarded.

In one or more embodiments, processor 208 may be configured to present a modified game to evaluate and/or improve performance in an animal with a disability or disease.

Processor 208 may be configured to display the stimuli with animation. For example, movement of the stimuli on display device 202 may be used to evaluate and/or improve memory, object tracking, excitability, speed, coordination, or any other skill.

In one or more embodiments, processor 208 is further configured to determine the identity of an animal interacting with the cognitive enrichment system 200. Processor 208 may be configured to distinguish an identity of a first animal registered with cognitive enrichment system 200 and a second animal registered with cognitive enrichment system 200. Processor 208 may also be configured to distinguish between registered animals and nonregistered animals. In one or more embodiments, identity is established based on microchip, RFID, Bluetooth, or any other wireless device fastened to the collar or otherwise attached to the animal.

In one or more embodiments, processor 208 is further configured to perform signal processing to detect an identity of an animal, to detect an input from the animal, or to detect a triggering event.

In one or more embodiments, cognitive enrichment system 200 includes network communication device 212. Network communication device 212 is configured to access network 214. Network 214 may include one or more Local Area Networks (LAN) Wide Area Networks (WAN), wireless networks, optical networks, distributed networks, the Internet or any other network or combination thereof.

In one or more embodiments, processor 208 uses network communication device 212 to download at least one software module over network 214. The software module includes computer-readable software instructions that, when executed by processor 208, modifies at least one of the stimuli displayed, the input processing, and the dispensing decision. In effect, a number of games may be accessed using network communication device 212 over network 214.

In one or more embodiments, processor 208 is further configured to use network communication device 212 to download nutritional information over network 214. Nutritional information may be downloaded for a plurality of food types stored in one or more food chambers of reward dispenser 206. Processor 208 may be further configured to calculate nutritional intake information based on a quantity of food dispensed of each of the plurality of food types.

In one or more embodiments, processor 208 uses network communication device 212 to upload local data corresponding to the animal over the network 214, download cloud data corresponding to other animals over network 214, and display a comparison of the local data and the cloud data. The cloud data may include trend data that is generated based the other animals, or based on any subset of the other animals. A subset of the other animals may be defined by parameter data. Any parameter may be used to classify the plurality of animals and provide trend data for each classification. For example, trend data may be generated for subsets based on animal breed, age, sex, weight, diseases, allergies, disposition, household data, and any other characteristic or combination thereof. In one or more embodiments, the comparison allows a user to view the differences between the animal associated with cognitive enrichment system 200 and similar animals regarding information such as menu choice data, nutritional intake data, cognitive data, performance data, activity data, behavioral data, physiological data, or any other recordable data. In one or more embodiments, the comparison is displayed on display device 202. The comparison may also be displayed on any remote computing device authorized to access local information about the animal, such as a cellular telephone, a smart phone, a PDA, a mobile computer, any other mobile computing device, a computer, a server, or any other computer.

Figure 3:
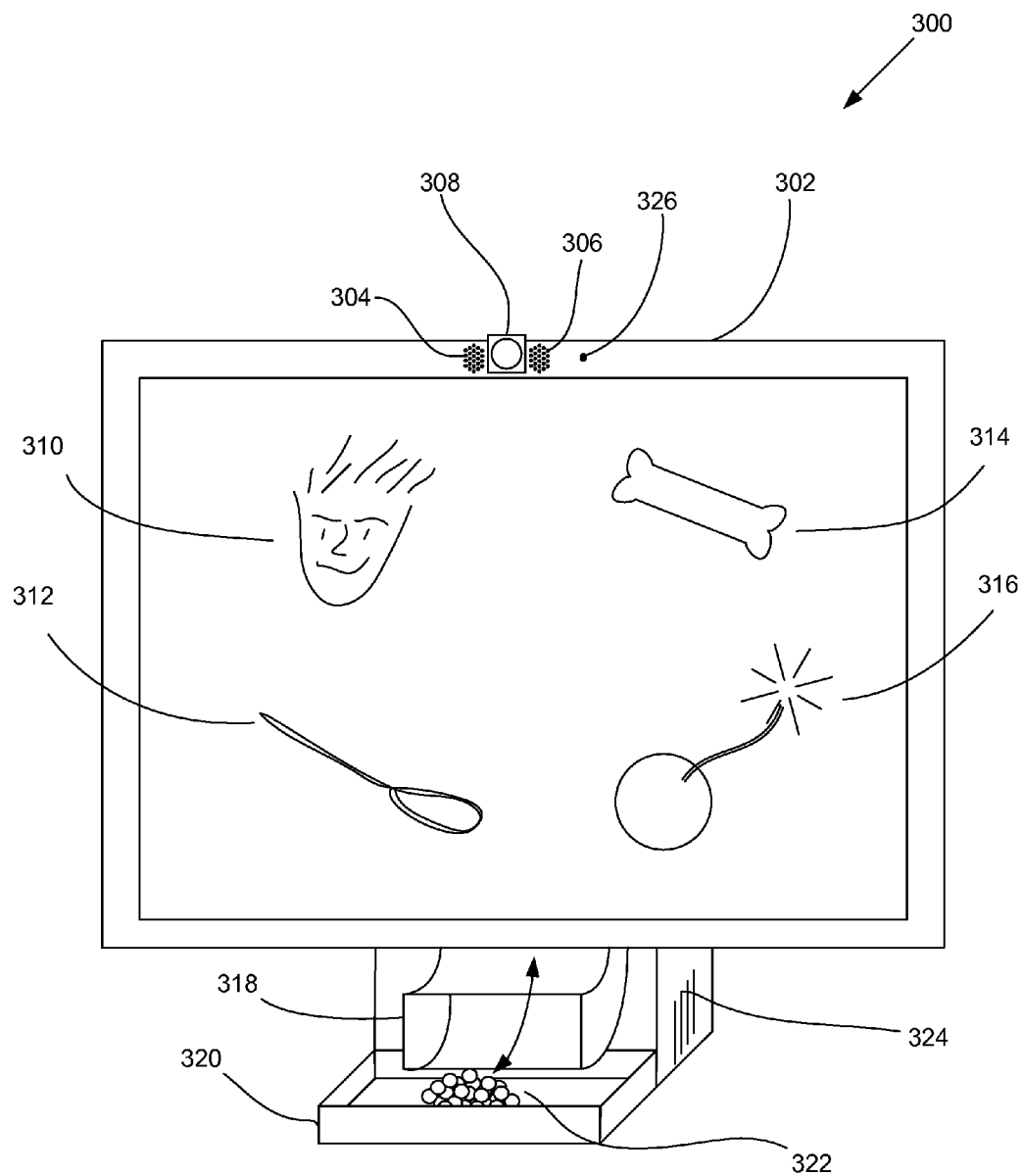
FIG. 3 illustrates an exemplary cognitive enrichment system in accordance with one or more embodiments of systems and methods for cognitive enrichment of an animal.

FIG. 3 illustrates an exemplary cognitive enrichment device in accordance with one or more embodiments of systems and methods for cognitive enrichment of an animal. The animal may include any domesticated animal, including any pet, such as canines, felines and any other domesticated animal. Cognitive enrichment device 300 includes touch-screen device 302. Touch-screen device 302 functions as both a display device and an input device. Touch-screen device 302 is configured to display stimuli 310-316. Touch-screen device 302 is also configured to accept input from the animal. The input may correspond to at least one of the stimuli 310-316. In one or more embodiments, input associated with a selected stimuli is determined based on touch input on a region of touch-screen device 302 where the selected stimuli is displayed.

Cognitive enrichment device 300 may include image capture device 308. Image capture device 308 may be used to determine a proximity of an animal or to determine an identity of the animal. Image capture device 308 may also be used to generate a video feed to send to a remote computing device, such as over a network. The network may include one or more Local Area Networks (LAN) Wide Area Networks (WAN), wireless networks, optical networks, distributed networks, the Internet or any other network or combination thereof.

In one or more embodiments, a sound, treat, or other signal may be used to entice or train the animal to come within range of the image capture device. The animal may be trained to associate a unique sound or another unique signal with connection requests from specific users.

The remote computing device may include a cellular telephone, a smart phone, a PDA, a mobile computer, any other mobile computing device, a computer, a server, or any other computer. In one or more embodiments, a connection to the remote computing device is established when a triggering event is detected, such as by image capture device 308, microphone 326, an environmental sensor, or a maintenance sensor configured to generate a warning when the cognitive enrichment device requires attention and/or refilling. A triggering event may also include a connection request from a remote computing device, such as a computing device authenticated to connect with the cognitive enrichment device. A triggering event may also include input from an animal indicating a desire to connect to a remote computing device.

In one or more embodiments, the remote computing device is a second cognitive enrichment device connected to the network. The second user of the second cognitive enrichment device may be an animal.

In one or more embodiments, a remote video feed received from the remote computing device is displayed on a display device, such as touch-screen 302. In one or more embodiments, the remote video feed is displayed on a display device with image capture device 308 mounted to it, simulating a video chat environment in real time where a user of that remote computing device and an animal user of the cognitive enrichment device may simultaneously view each other.

Optional microphone 326 may be used to generate an audio stream associated with the video feed. In one or more embodiments, microphone 326 may be used as an environmental sensor, such as to verify an identity of an animal. Microphone 326 may also be used as an input device, such as to accept an input corresponding to a stimuli selected by the animal.

One or more optional speakers 302-304 may be used to play an audio stream associated with the remote video feed displayed. In one or more embodiments, speakers 302-304 may be used to play auditory rewards, including both positive and negative rewards. In one or more embodiments, only positive rewards are generated and/or dispensed by cognitive enrichment device 300.

Cognitive enrichment device 300 further includes reward dispenser 318. Reward dispenser 318 is configured to dispense a reward 322. Cognitive enrichment device 300 may include a reward container 320 to hold reward 322 dispensed by reward dispenser 318. In one or more embodiments, reward 322 is a food reward.

In one or more embodiments, stimuli 310-316 displayed on touch-screen device 302 are objects displayed in game, where a correct response may be determined. The dispensing decision is based on a comparison of the input from the animal to the correct response. The game may be configured to evaluate and/or improve one or more skills of the animal, such as a cognitive skill, a coordination skill, a memory skill, a speed skill, an accuracy skill, a behavioral skill, or any other skill.

In one or more embodiments, the game is a level selected from a multi-level battery of cognitive training exercises. In an exemplary multi-leveled battery of cognitive training exercises, a preliminary level may be used to acclimate the animal to the cognitive enrichment system. A reward level may be used to acclimate the animal to the presentation of the reward, including the method of delivery of the reward. An object level may be used for associating an object selection with a reward. During an object level trial, a stimulus is presented to the animal, and the animal earns the reward by selecting the stimulus. A discrimination level may be used for associating a specific object with a reward. During a discrimination level trial, two or more stimuli are presented to the animal, and the animal earns the reward by selecting the correct stimulus associated with the reward. A reversal level may be used to disassociate a previously learned association between a reward and a specific object. During a reversal level trial, two or more stimuli are presented to the animal, where selection of a first stimulus was previously rewarded. The animal earns the reward by selecting a second stimulus that was previously unrewarded.

Cognitive enrichment device 300 may be configured to present a modified game to evaluate and/or improve performance in an animal with a disability or disease. In one or more embodiments, at least one stimuli 310-316 is displayed with animation. For example, movement may be used to evaluate and/or improve memory, object tracking, excitability, speed, coordination, or any other skill.

Cognitive enrichment device 300 may further include housing 324 for a processor. The processor is communicatively coupled with the touch-screen 302 and reward dispenser 318. In one or more embodiments, the processor is wirelessly coupled with touch-screen 302 and reward dispenser 318. Although FIG. 3 shows touch-screen 302 (a display device combined with an input device), reward dispenser 318 and housing 324 containing the processor as a single unit of physically connected components, these components may be provided as separate units capable of wireless communication without departing from the spirit or the scope of the invention.

Figure 4:
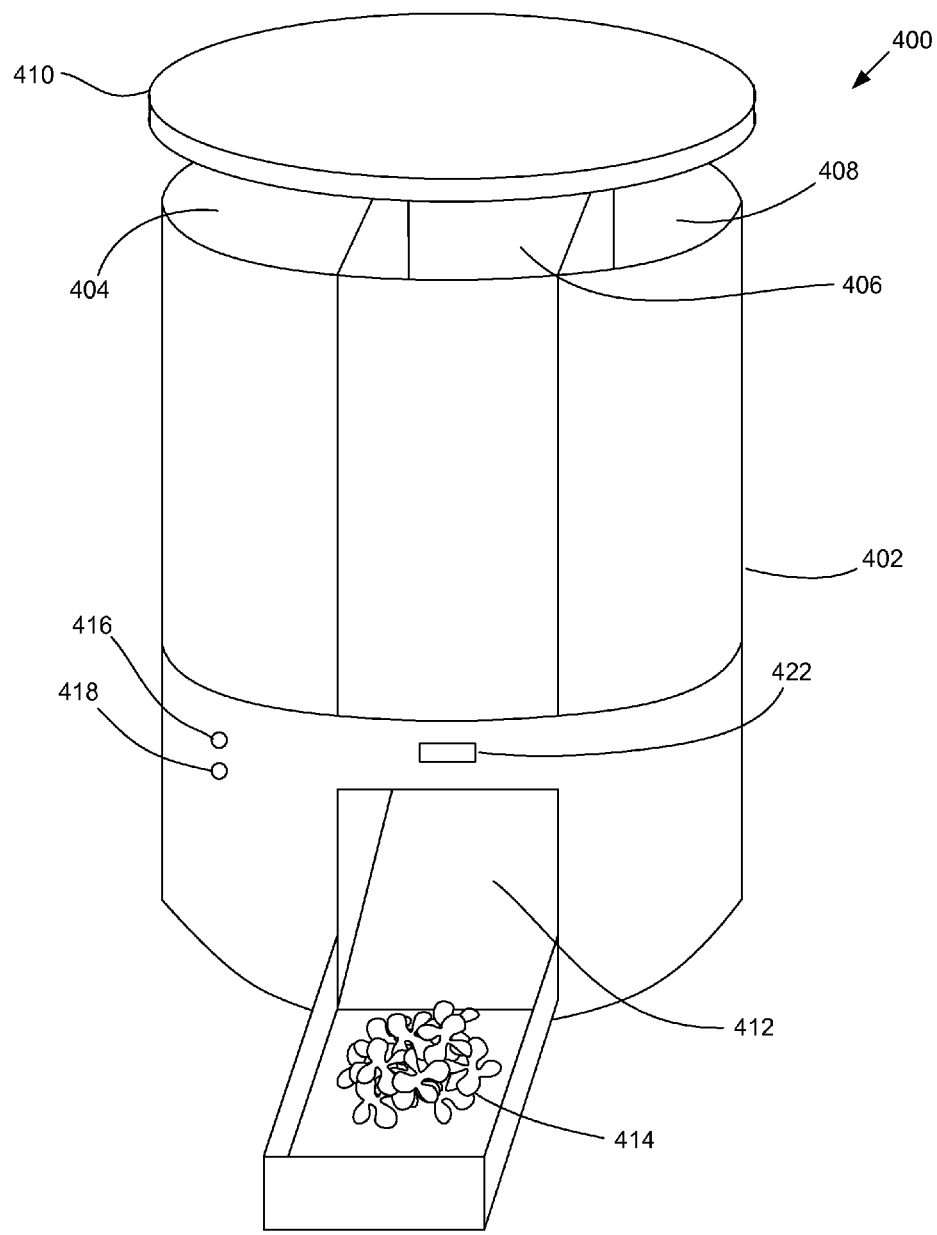
FIG. 4 illustrates an exemplary reward dispenser in accordance with one or more embodiments of systems and methods for cognitive enrichment of an animal.

FIG. 4 illustrates an exemplary reward dispenser in accordance with one or more embodiments of systems and methods for cognitive enrichment of an animal. Multi-food dispenser 400 includes a plurality of food chambers 404-408. In one or more embodiments, food chambers 404-408 are formed as partitions of divided housing 402. One or more lids 410 may be used to provide access to food chambers 404-408.

Multi-food dispenser 400 is configured to dispense at least one selected food from food chambers 404-408. In one or more embodiments, the selected food is based on an input from the animal. The input may correspond to a stimuli selected by the animal from the displayed stimuli, which are shown in further detail at FIG. 5.

Multi-food dispenser 400 may further include wireless sensor 422 capable of receiving control signals from a processor of the cognitive enrichment device. The control signals may be any form of wireless energy, such as radiofrequency, infrared, laser, visible light, acoustic energy, Bluetooth, or any other energy capable of transferring information wirelessly. Alternatively, multi-food dispenser 400 may have a physical connection to communicate with the processor of the cognitive enrichment device.

Multi-food dispenser 400 may further include dispensing mechanism 412 for dispensing a predetermined quantity of selected food 414 from one of food chambers 404-408. Methods for dispensing a predetermined quantity of a substance from a chamber are known in the art, and any of these methods may be used without departing from the spirit or the scope of the invention.

Multi-food dispenser 400 may further include one or more indicators 416-418. Indicators 416-418 may turn on to indicate low battery power, disconnection from a power source, a low or empty food chamber, a mechanical error, a blockage, or any other error or status of multi-food dispenser 400 requiring attention.

Figure 5:
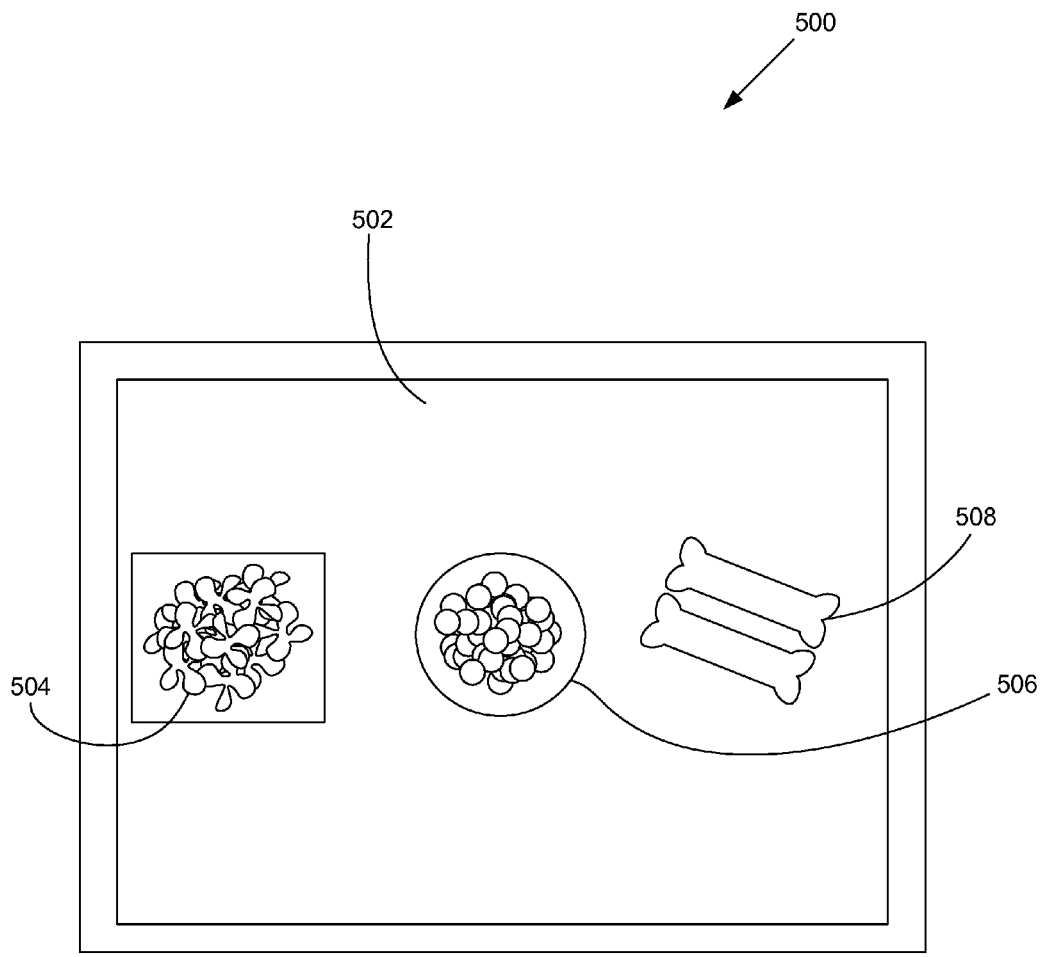
FIG. 5 illustrates an exemplary display device in accordance with one or more embodiments of systems and methods for cognitive enrichment of an animal.

FIG. 5 illustrates an exemplary display device in accordance with one or more embodiments of systems and methods for cognitive enrichment of an animal. Stimuli 504-508 are displayed on a screen 502 of display device 500. Stimuli 504-508 are each associated with a food type stored in the plurality of food chambers 404-408 of multi-food reward dispenser 400. Stimuli 504-508 may include an image of the associated food type. In one or more embodiments, additional cues, such as differing shapes and colors, are also used to help the animal distinguish the available food types offered. Over time, the animal will learn to associate the different shapes and colors with the different food types. Exemplary methods for implementing menu selection for an animal are discussed in further detail at FIGS. 8-9.

Figure 6:
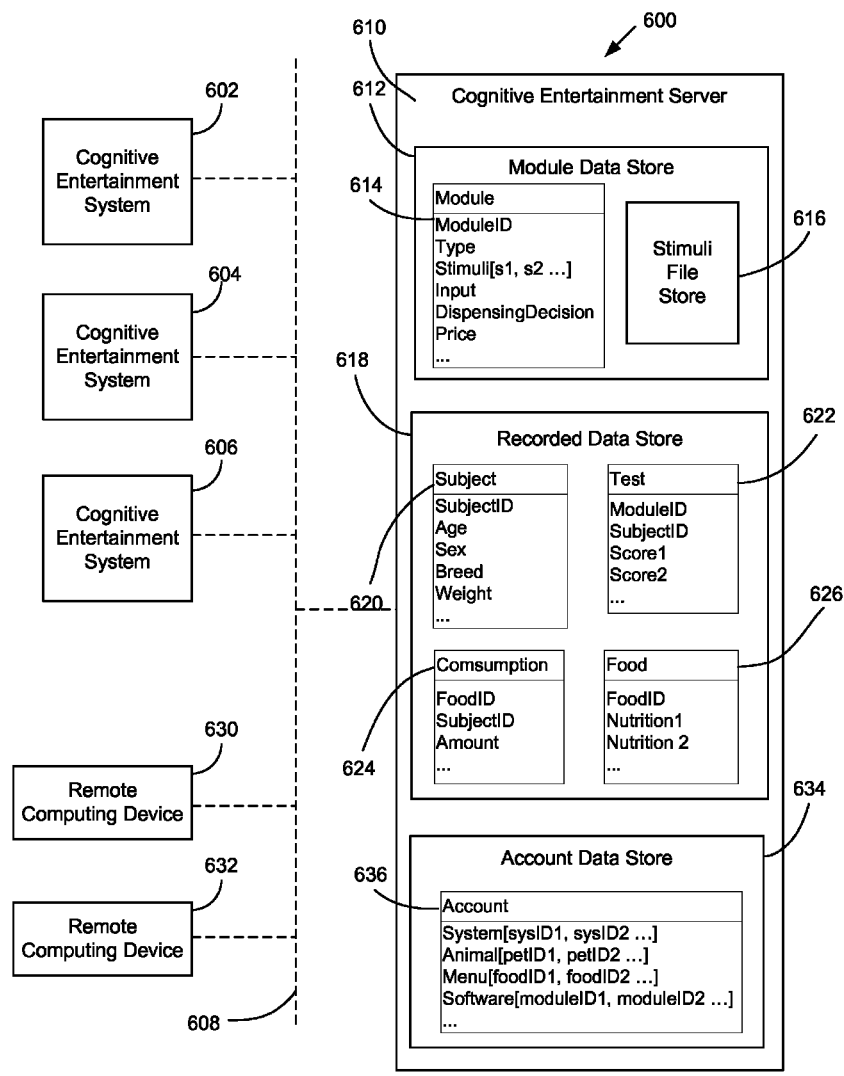
FIG. 6 illustrates an exemplary extended, networked system in accordance with one or more embodiments of systems and methods for cognitive enrichment of an animal.

FIG. 6 illustrates an exemplary extended, networked system in accordance with one or more embodiments of systems and methods for cognitive enrichment of an animal. System 600 includes a plurality of cognitive enrichment systems 602-606, each having a network communication device capable of connecting to network 608. Network 608 may include one or more Local Area Networks (LAN) Wide Area Networks (WAN), wireless networks, optical networks, distributed networks, the Internet or any other network or combination thereof.

System 600 further includes cognitive enrichment server 610. An exemplary diagram of data stored and used by cognitive enrichment server 610 is shown to give an idea of the versatility, power and functionality of cognitive enrichment server 610 based on the stored data. However, one of ordinary skill in the art will recognize that any other configuration of data may be used without departing from the spirit or the scope of the invention as described herein.

Cognitive enrichment server 610 may include module data store 612. Module data store 612 stores a plurality of modules available over network 608 to cognitive enrichment system 602-606. In one or more embodiments, each module includes computer-readable instructions configured to modify stimuli displayed, said input accepted, and/or dispensing decisions in cognitive enrichment systems 602-606. In one or more embodiments, the stimuli displayed our object displayed in a game configured to evaluate and/or improve one or more skills of the animal, such as a cognitive skill, a coordination skill, a memory skill, a speed skill, and accuracy skill, a behavioral skill, or any other skill. For example, module data 614 store for each module may include a module ID, a module type, a set of stimuli for display, input handling, dispensing decision, module price, or any other information useful for implementing the module on a cognitive enrichment system. Modules may be priced for free or for a cost. In one or more embodiments, modules may be submitted by third-parties, including owners of a cognitive enrichment system.

Module data store 612 includes stimuli file store 616. In one or more embodiments, stimuli file store includes stimuli file data, such as image data, sound data, and animation data associated with one or more modules. Stimuli file data may be stored and provided along with each downloaded module to enable the execution of the module on cognitive enrichment systems 602-606.

Cognitive enrichment server 610 may include recorded data store 618. Recorded data store 618 includes any recordable data recorded by cognitive enrichment system 602-606, such as menu choice data, nutritional intake data, cognitive data, performance data, activity data, behavioral data, physiological data, timing information, amount information, type information, score information, speed information, or any other information recordable by cognitive enrichment devices 602-606. For example, recorded data store 618 may include parameter data 620 on each subject, such as a subject identifier, age, sex, breed, weight, and/or any other parameter data.

Recorded data store 618 may also include consumption data 624, such as a food identifier, a subject identifier, an amount, and/or any other consumption data.

Recorded data store 618 may also include test data 622, such as a module identifier, a subject identifier, one or more scores, and any other test or module data. Scores may include timing information, speed information, accuracy information or any other score.

Recorded data store 618 may also include food data 626, such as a food identifier and one or more nutritional values such as ingredients, calories, vitamins, minerals, protein, ash, fat, carbohydrates, or any other nutritional limitation. In one or more embodiments, food data includes a rating based on aggregated data contained in recorded data store 618.

System 600 further includes remote computing devices 630-632. Remote computing devices 630-632 include any remote computing device authorized to access local information on one or more cognitive enrichment system 602-606, such as a cellular telephone, a smart phone, a PDA, a mobile computer, any other mobile computing device, a computer, a server, or any other computer. Cognitive enrichment devices 602-606 may be configured to connect to remote computing devices 630-632, such as to transfer information, including transmitting a video feed or receiving a remote video feed. In one or more embodiments, remote computing devices 630-632 may include cognitive enrichment devices 602-606 connected to the network.

In one or more embodiments, remote computing devices 630-632 may be used to access and display trend data and comparative data from cognitive enrichment server 610 and a cognitive enrichment system, where the remote computing device is authorized to access the cognitive enrichment system. In one or more embodiments, remote computing devices 630-632 may be used to manage an account associated with the cognitive enrichment system, including add-on modules, bill payment, security settings, and any other account management feature.

In one or more embodiments, cognitive enrichment server 610 manages advertisement and/or sale of tangible goods compatible with cognitive enrichment devices 602-606, such as additional pet products for training and/or entertainment. Cognitive enrichment server 610 may also manage advertisement and/or sale of one or more food types, including food types associated with one or more preferred food types and/or preferred brands. Cognitive enrichment server 610 may preferentially maintain food data 620 641 or more preferred food types and/or preferred brands. In one or more embodiments, cognitive enrichment server 610 is configured to communicate with cognitive enrichment devices 602-606 to determine when a specific food type associated with a food chamber is low. Cognitive enrichment server 610 may automatically generate an order and/or a notification to re-order the specific food type.

Figure 7:
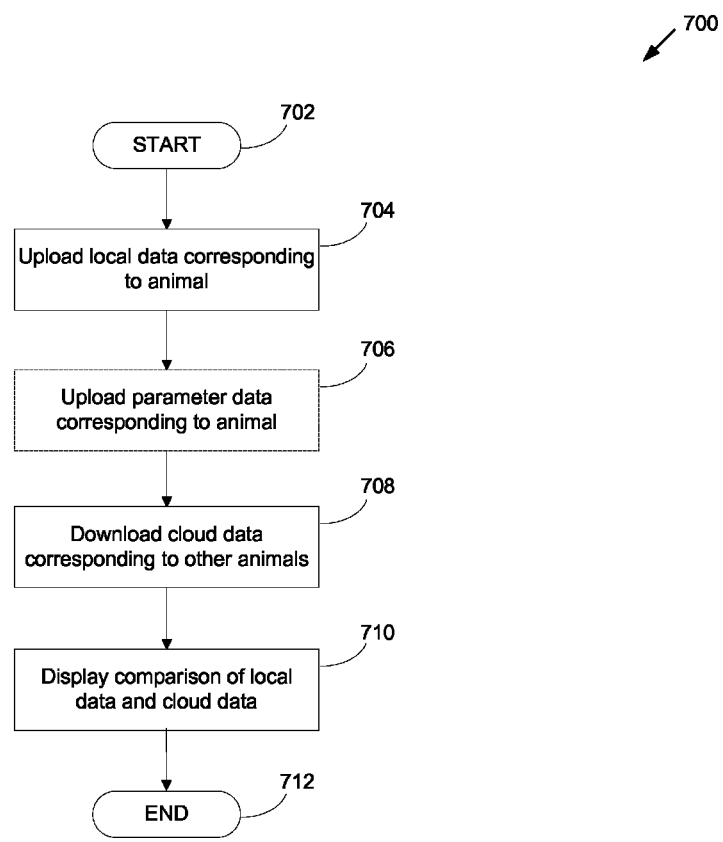
FIG. 7 is a flowchart of an exemplary method for sending and receiving data in accordance with one or more embodiments of systems and methods for cognitive enrichment of an animal.

FIG. 7 is a flowchart of an exemplary method for sending and receiving data in accordance with one or more embodiments of systems and methods for cognitive enrichment of an animal. Process 700 begins at step 702.

Processing continues to step 704, where local data corresponding to an animal is uploaded over a network. In one or more embodiments, the local data is uploaded to a central or distributed server configured to aggregate local data. The local data may include any data recordable by a cognitive enrichment device configured to monitor and record animal data in real time. The local data may include at least one of menu choice data, nutritional intake data, cognitive data, performance data, activity data, behavioral data, physiological data, or any other recordable data based on interaction between a cognitive enrichment device and an animal. The local data may include timing information, amount information, type information, score information, speed information, or any other information recordable by the cognitive enrichment device.

Processing continues to optional step 706, where parameter data corresponding to the animal is uploaded over the network. The parameter data may include at least one parameter selected from animal breed, age, sex, weight, diseases, allergies, disposition, and any other characteristic of the animal. In one or more embodiments, the parameter data includes at least one parameter reflecting an animal's household.

Processing continues to step 708, where cloud data corresponding to other animals is downloaded over the network. The cloud data may include trend data that is generated based on all of the other animals, or based on any subset of the other animals. A subset of the other animals may be defined by parameter data. Any parameter may be used to classify the plurality of animals and provide trend data for each classification. For example, trend data may be generated for subsets based on animal breed, age, sex, weight, diseases, allergies, disposition, household data, and any other characteristic or combination thereof.

Processing continues to step 710, where a comparison of the local data and the cloud data is displayed. In one or more embodiments, the comparison allows a user to view the differences between the animal and similar animals regarding information such as menu choice data, nutritional intake data, cognitive data, performance data, activity data, behavioral data, physiological data, or any other recordable data. In one or more embodiments, the comparison is displayed on a display device of the cognitive enrichment device. The comparison may also be displayed on any remote computing device authorized to access local information, such as a cellular telephone, a smart phone, a PDA, a mobile computer, any other mobile computing device, a computer, a server, or any other computer.

Processing continues to step 712, where process 700 terminates.

Figure 8:
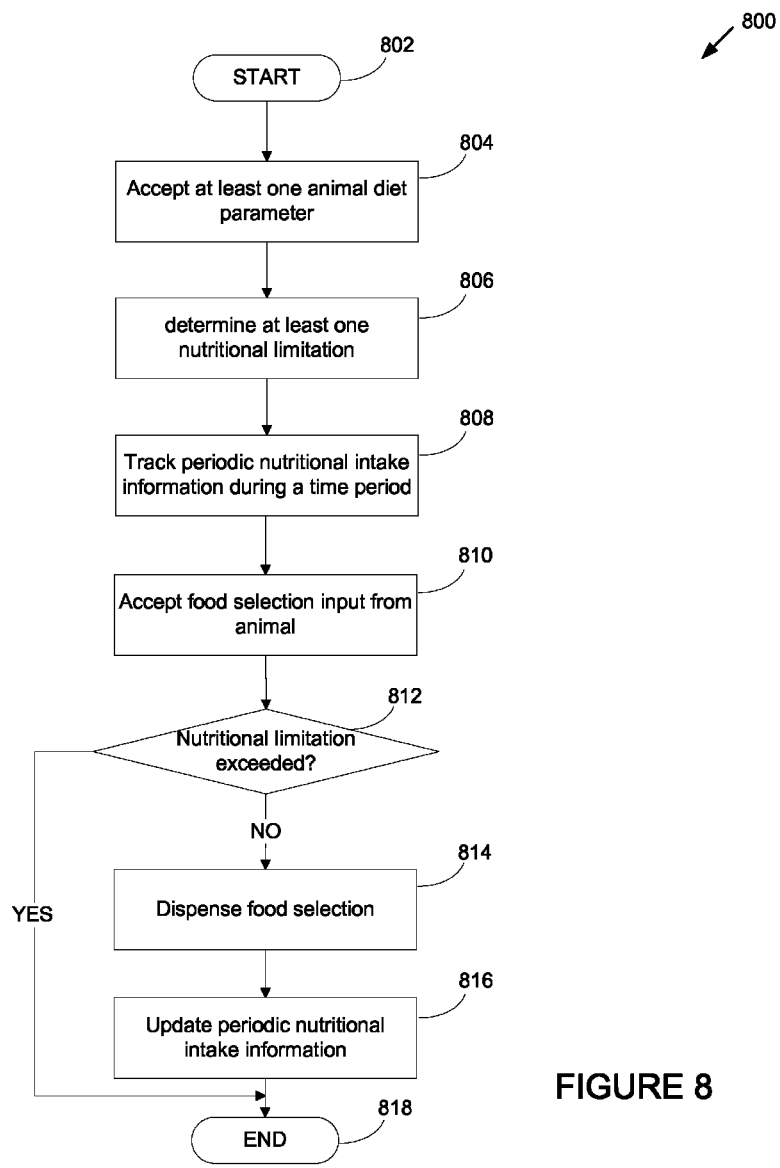
FIG. 8 is a flowchart of an exemplary method for implementing menu selection based on a nutritional limitation in accordance with one or more embodiments of systems and methods for cognitive enrichment of an animal.

FIG. 8 is a flowchart of an exemplary method for implementing menu selection based on a nutritional limitation in accordance with one or more embodiments of systems and methods for cognitive enrichment of an animal. Process 800 begins at step 802.

Processing continues to step 804, where at least one animal diet parameter is accepted. The at least one animal diet parameter corresponds to an animal. In one or more embodiments, the animal is a canine. Animal diet parameters may include any characteristic of the animal relevant to dietary intake, including weight, breed, age, activity level, diseases, allergies, desired weight change, or any other characteristic of the animal relevant to dietary intake.

Processing continues to step 806, where at least one nutritional limitation is determined based on the at least one animal diet parameter. In one or more embodiments, the at least one nutritional limitation is determined for a time period. A nutritional limitation includes any minimum maximum amount of calories, vitamins, minerals, protein, ash, fat, carbohydrates, or any other nutritional limitation.

Processing continues to step 808, where periodic nutritional intake information is tracked for a time period corresponding to the nutritional limitation. The periodic nutritional intake information corresponds to food dispensed during the current time period. In one or more embodiments, nutritional information for each food type may be manually entered or downloaded. The periodic nutritional intake information may be programmed to take into account other foods consumed by the animal. The periodic nutritional intake information is periodically reset based on the time period associated with the at least one nutritional limitation.

Processing continues to step 810, where a food selection input is accepted from the animal. In one or more embodiments, the food selection corresponds to a selected food type selected from the available food types in the reward dispenser.

Processing continues to decision step 812, where it is determined whether or not any nutritional limitation has been exceeded. In one or more embodiments, decision step 812 includes determining whether or not dispensing a selected food type will result in exceeding any nutritional limitation.

If any nutritional limitation is exceeded, processing continues to step 818, where process 800 terminates.

Returning to decision step 812, if no nutritional limitation will be exceeded, processing continues to step 814, where the selected food type is dispensed. In one or more embodiments, if dispensing a full amount of the selected food type will exceed any nutritional limitation, a partial amount of the selected food type will be dispensed such that the nutritional limitation is not exceeded.

Processing continues to step 816, where the periodic nutritional intake information is updated. The periodic nutritional intake information may be updated based on the food type and quantity dispensed.

Processing continues to step 818, where process 800 terminates

Figure 9:
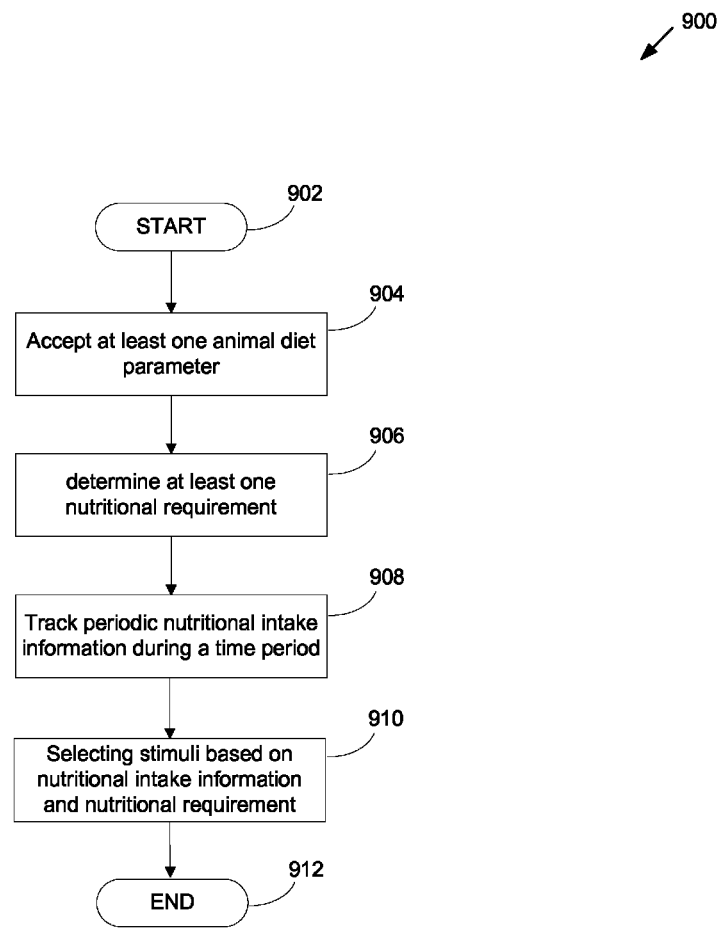
FIG. 9 is a flowchart of an exemplary method for implementing menu selection based on a nutritional requirement in accordance with one or more embodiments of systems and methods for cognitive enrichment of an animal.

FIG. 9 is a flowchart of an exemplary method for implementing menu selection based on a nutritional requirement in accordance with one or more embodiments of systems and methods for cognitive enrichment of an animal. Process 900 begins at step 902.

Processing continues to step 904, where at least one animal diet parameter is accepted. The at least one animal diet parameter corresponds to an animal. In one or more embodiments, the animal is a canine. Animal diet parameters may include any characteristic of the animal relevant to dietary intake, including weight, breed, age, activity level, diseases, allergies, desired weight change, or any other characteristic of the animal relevant to dietary intake.

Processing continues to step 906, where at least one nutritional requirement is determined based on the at least one animal diet parameter. In one or more embodiments, the at least one nutritional requirement is determined for a time period. A nutritional requirement includes any minimum recommended amount of calories, vitamins, minerals, protein, or any other nutritional requirement.

Processing continues to step 908, where periodic nutritional intake information is tracked for a time period corresponding to the nutritional requirement. The periodic nutritional intake information corresponds to food dispensed during the current time period. In one or more embodiments, nutritional information for each food type may be manually entered or downloaded. The periodic nutritional intake information may be programmed to take into account other foods consumed by the animal. The periodic nutritional intake information is periodically reset based on the time period associated with the at least one nutritional requirement.

Processing continues to step 910, where stimuli are selected based on the periodic nutritional intake information and the at least one nutritional requirement. In one or more embodiments, the available stimuli from which the stimuli are selected correspond to the available food types in the reward dispenser. The stimuli may be selected based on their ingredients and nutritional values to increase the likelihood that the at least one nutritional requirement is met during the current time period.

Processing continues to step 912, where process 900 terminates.

Figure 10:
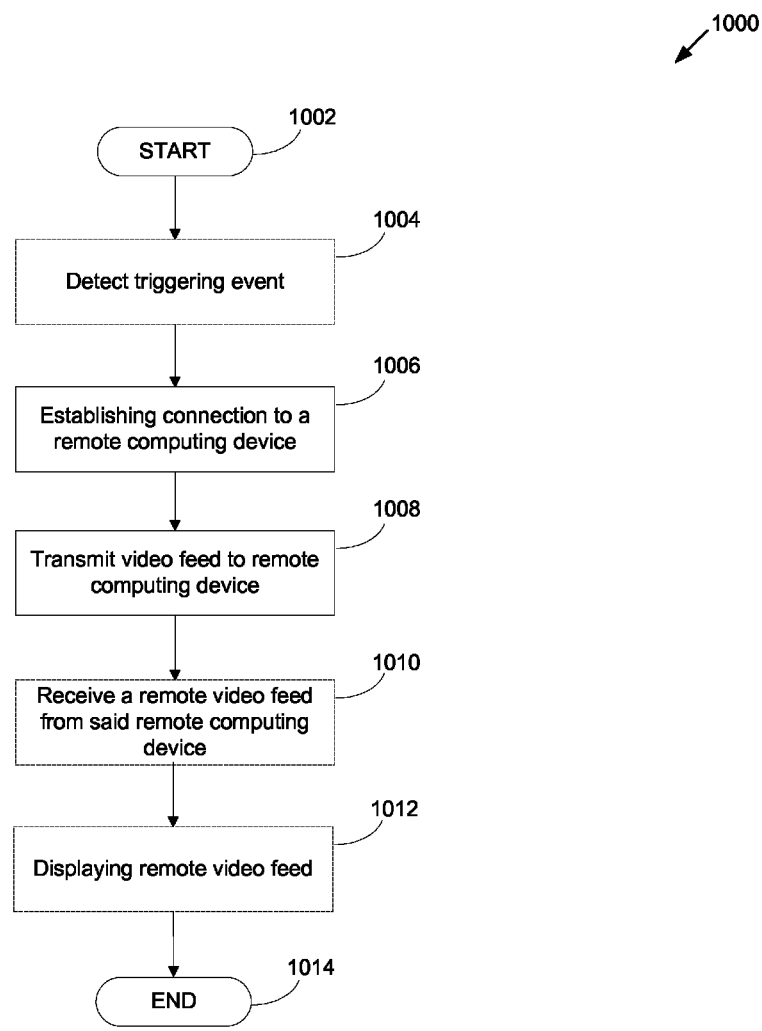
FIG. 10 is a flowchart of an exemplary method for sending and receiving video data in accordance with one or more embodiments of systems and methods for cognitive enrichment of an animal.

FIG. 10 is a flowchart of an exemplary method for sending and receiving video data in accordance with one or more embodiments of systems and methods for cognitive enrichment of an animal. Process 1000 begins at step 1002.

Processing continues to optional step 1004, where a triggering event is detected. The triggering event may be detected by an image capture device, a microphone, an environmental sensor, or a maintenance sensor configured to generate a warning when the cognitive enrichment device requires attention and/or refilling. A triggering event may also include a connection request from a remote computing device, such as a computing device authenticated to connect with the cognitive enrichment device. A triggering event may also include input from an animal indicating a desire to connect.

Processing continues to step 1006, where a connection to a remote computing device is established. The remote computing device may include a cellular telephone, a smart phone, a PDA, a mobile computer, any other mobile computing device, a computer, a server, or any other computer. The connection to the remote computing device is established over a network, including one or more Local Area Networks (LAN) Wide Area Networks (WAN), wireless networks, optical networks, distributed networks, the Internet or any other network or combination thereof. The computing device may be previously authenticated to connect with the cognitive enrichment device, or authorization may be required to establish the connection. In one or more embodiments, the remote computing device is a second cognitive enrichment device connected to the network. The second user of the second cognitive enrichment device may be an animal.

Processing continues to step 1008, where the video feed is transferred to the computing device. In one or more embodiments, the cognitive enrichment device generates the video feed using one or more image capture devices. In one or more embodiments, a sound, treat, or other signal may be used to entice or train the animal to come within range of the image capture device. The animal may be trained to associate a unique sound or another unique signal with connection requests from specific users.

Processing continues to optional step 1010, where a remote video feed is received from the remote computing device.

Processing continues to optional step 1012, where the remote video feed is displayed on at least one of the display devices of the cognitive enrichment device. In one or more embodiments, the remote video feed is displayed on a display device with the image capture device mounted to it, simulating a video chat environment where a user of that remote computing device and an animal user of the cognitive enrichment device may simultaneously view each other.

Processing continues to step 1014, where process 1000 terminates.

Figure 11:
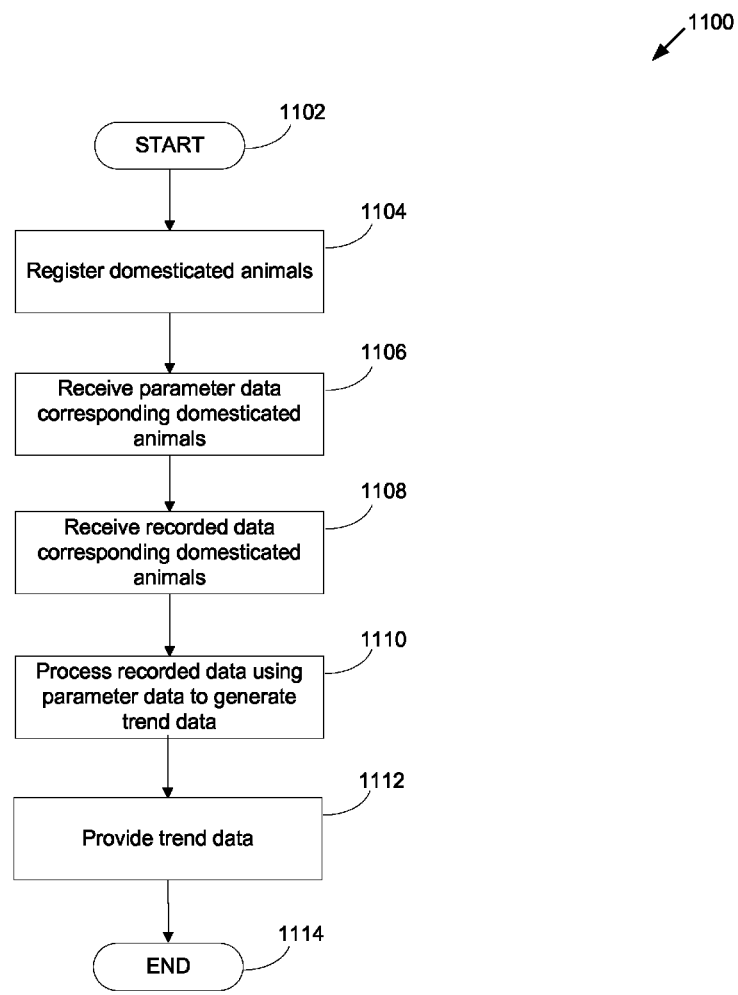
FIG. 11 is a flowchart of an exemplary method for collecting and providing data with one or more embodiments of systems and methods for cognitive enrichment of an animal.

FIG. 11 is a flowchart of an exemplary method for collecting and providing data with one or more embodiments of systems and methods for cognitive enrichment of an animal. Process 1100 begins at step 1102.

Processing continues to step 1104, where a plurality of domesticated animals are registered. The registered animals may each be associated with a cognitive enrichment device configured to interact with the animal.

Processing continues to step 1106, where parameter data corresponding to the plurality of domesticated animals is received. The parameter data includes at least one parameter selected from animal breed, age, sex, weight, diseases, allergies, disposition, and any other characteristic of the animal. In one or more embodiments, the parameter data includes at least one parameter reflecting an animal's household.

Processing continues to step 1108, where recorded data corresponding to the plurality of domesticated animals is received. The recorded data may be received from one or more cognitive enrichment devices configured to monitor and record animal data in real time. The recorded data may include at least one of menu choice data, nutritional intake data, cognitive data, performance data, activity data, behavioral data, physiological data, or any other recordable data based on interaction between a cognitive enrichment device and an animal. The recorded data may include timing information, amount information, type information, score information, speed information, or any other information recordable by the cognitive enrichment device.

Processing continues to step 1110, where recorded data is processed using parameter data to generate trend data. The trend data may include any statistical data, including mean, medium, moved, range, standard deviation, and other statistical data. The trend data may be generated for any subset of the plurality of domesticated animals, such as any subset defined by parameter data. Any parameter may be used to classify the plurality of animals and provide trend data for each classification. For example, trend data may be generated for subsets based on animal breed, age, sex, weight, diseases, allergies, disposition, household data, and any other characteristic.

Processing continues to step 1112, where the trend data is provided to at least one of the cognitive enrichment devices associated with at least one of the plurality of domesticated animals. In one or more embodiments, the trend data provided to a cognitive enrichment device includes statistical data for animals sharing one or more parameters with the animal associated with the cognitive enrichment device.

Trend data may be provided for individual matching parameters as well as for combinations of matching parameters. For example, if the animal associated with the cognitive enrichment device is an 8 year old female beagle, trend data may be provided for subsets of the plurality of domesticated animals, including: all animals, all beagles (i.e. by breed), all females (i.e. by sex), all senior animals (i.e. by age), all senior females (i.e. by age and sex), all senior beagles (i.e. by age and breed), all female beagles (i.e. by sex and breed), and all senior female beagles (i.e. by age, sex and breed). Although possible trend data based on age, sex and breed are described in this example, the trend data may be provided based on any set of parameters.

Processing continues to step 1114, where process 1100 terminates.

While the invention herein disclosed has been described by means of specific embodiments and applications thereof, numerous modifications and variations could be made thereto by those skilled in the art without departing from the scope of the invention set forth in the claims.

What is claimed is:

1. A method for cognitive enrichment of a domesticated animal comprising:
    providing at least one display device and said at least one input device in a touch-screen display capable of displaying images on a screen and accepting touch input on said screen;
    displaying one or more stimuli to an animal using at least one display device;
    accepting an input from said animal corresponding to one or more stimuli;
    making a dispensing decision based on said input; and
    dispensing a reward using at least one reward dispenser based on said dispensing decision.

2. The method of claim 1, wherein at least one of said at least one display device, said at least one input device, and said at least one reward dispenser is communicatively coupled with at least one processor.

3. The method of claim 1, wherein said at least one reward dispenser comprises a plurality of food chambers configured to store a plurality of food types, wherein said at least one reward dispenser is configured to dispense at least one selected food from at least one of said plurality of food chambers.

4. The method of claim 3, wherein said one or more stimuli comprises images corresponding to said plurality of food types, wherein said input comprises a food selection corresponding to a selected food type.

5. The method of claim 1, wherein said dispensing decision is based on at least one nutritional calculation and wherein said reward comprises said selected food type.

6. The method of claim 1, further comprising:
    accepting from a user at least one animal diet parameter corresponding to said animal;
    determining at least one nutritional limitation for a time period based on said at least one animal diet parameter;
    tracking periodic nutritional intake information corresponding to food dispensed during a current time period; and
    periodically resetting said periodic nutritional intake information, wherein said nutritional calculation comprises determining if dispensing said reward would exceed any of said at least one nutritional limitation during said current time period.

7. The method of claim 1, further comprising:
    accepting from a user at least one animal diet parameter corresponding to said animal;
    determining at least one nutritional requirement for a time period based on said at least one animal diet parameter;
    tracking periodic nutritional intake information corresponding to food dispensed during a current time period;
    selecting said stimuli for display based on said periodic nutritional intake information and said at least one nutritional requirement; and
    periodically resetting said periodic nutritional intake information.

8. The method of claim 1, further comprising:
    receiving a remote video feed from a remote computing device; and
    displaying said remote video feed on at least one of said at least one display device.

9. The method of claim 1, further comprising:
    uploading local data corresponding to said animal over a network;
    downloading cloud data corresponding to other animals over said network; and
    displaying a comparison of said local data and said cloud data.

10. The method of claim 1, wherein said animal is a canine.

11. A system for cognitive enrichment of a domesticated animal comprising:
    at least one display device configured to display stimuli to an animal;
    at least one input device configured to accept input from said animal;

at least one reward dispenser configured to dispense at least one reward to said animal;

at least one image capture device configured to capture a video feed; and a computer configured to perform a process comprising:
- displaying one or more stimuli to said animal using said at least one display device;
- accepting an input from said animal corresponding to at least one of said one or more stimuli;
- making a dispensing decision based on said input; and
- dispensing a reward using said at least one reward dispenser based on said dispensing decision; and
- transmitting said video feed to a remote computing device in response to at least one of an action of said animal, a threshold environmental reading, and a connection request from said remote computing device.

12. The system of claim 11, wherein said computer further performs process steps comprising:
- receiving a remote video feed from said remote computing device; and
- displaying said remote video feed on at least one of said at least one display device.

13. The system of claim 11, wherein said animal is a canine.

14. The system of claim 11, wherein said computer further determines an identity of said animal interacting with said at least one display device and said at least one input device.

15. The system of claim 11, wherein said one or more stimuli displayed to said animal comprises a game, and wherein said dispensing decision is based on a comparison of said input to a correct response.

16. The system of claim 15, wherein at least one of said one or more stimuli are displayed with animation.

17. The system of claim 15, wherein said game is configured to improve a skill of said animal.

18. The system of claim 15, wherein said game comprises a level selected from a multi-level battery of cognitive training exercises.

19. The system of claim 15, further comprising at least one add-on module downloadable over a network, wherein said at least one add-on module comprises computer-readable instructions configured to modify at least one of said stimuli, said input and said dispensing decision.

20. The system of claim 19, wherein said computer further uploads parameter data corresponding to said animal over said network, wherein said parameter data comprises at least one parameter selected from animal breed, age and sex.

* * * * *